(12) United States Patent
Park et al.

(10) Patent No.: US 11,267,412 B2
(45) Date of Patent: Mar. 8, 2022

(54) INSERT TYPE EXPANDABLE GARNISH AND METHOD OF INSTALLING THE SAME

(71) Applicants: Hyundai Motor Company, Seoul (KR); Kia Motors Corporation, Seoul (KR)

(72) Inventors: Eun-Soo Park, Busan (KR); Geun-Hyung Nam, Incheon (KR); Seung-Mok Lee, Gyeonggi-do (KR); Yong-Won Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 57 days.

(21) Appl. No.: 16/853,118

(22) Filed: Apr. 20, 2020

(65) Prior Publication Data
US 2021/0178988 A1 Jun. 17, 2021

(30) Foreign Application Priority Data
Dec. 13, 2019 (KR) .................. 10-2019-0167161

(51) Int. Cl.
*B60R 13/02* (2006.01)
(52) U.S. Cl.
CPC .................. *B60R 13/0275* (2013.01)
(58) Field of Classification Search
CPC ... B60R 13/0275; B60R 13/0206; B60R 5/12; B60R 5/123; F16B 5/12; F16B 5/123
USPC ........................................ 296/1.08
See application file for complete search history.

(56) References Cited

U.S. PATENT DOCUMENTS

| | | | | | |
|---|---|---|---|---|---|
| 3,634,991 | A | * | 1/1972 | Barton, Jr. | B60J 10/265 52/716.7 |
| 5,353,571 | A | * | 10/1994 | Berdan | B60R 13/04 24/293 |
| 6,681,543 | B2 | * | 1/2004 | Nada | B60R 13/04 264/249 |
| 7,641,250 | B2 | * | 1/2010 | Gambatese | B60R 13/04 296/1.08 |
| 2016/0325696 | A1 | * | 11/2016 | Rogge | B60R 13/04 |

FOREIGN PATENT DOCUMENTS

| | | | | |
|---|---|---|---|---|
| EP | 3248843 | A1 * | 11/2017 | ......... B60R 13/0206 |
| KR | 10-1998-027172 | | 7/1998 | |
| WO | WO-2011087968 | A1 * | 7/2011 | ............. F16B 21/08 |

\* cited by examiner

*Primary Examiner* — D Glenn Dayoan
*Assistant Examiner* — Kevin P Weldon
(74) *Attorney, Agent, or Firm* — Mintz Levin Cohn Ferris Glovsky and Popeo, P.C.; Peter F. Corless

(57) ABSTRACT

An insert type expandable garnish is provided and includes a body part that is inserted into a mounting part of a groove shape formed on the surface of a vehicle. A tension structure part is disposed on the body part to press the body part from the inner bottom surface of the mounting part toward the outside of the vehicle, when the body part is pressed toward the mounting part and inserted into the mounting part. An expandable bracket part protrudes from the body part and is adhered with the mounting part, when the tension structure part presses the body part.

18 Claims, 8 Drawing Sheets

INSERT TYPE EXPANDABLE GARNISH AND METHOD OF INSTALLING THE SAME

CROSS-REFERENCE TO RELATED APPLICATION

This application claims priority to Korean Patent Application No. 10-2019-0167161, filed on Dec. 13, 2019, which is incorporated herein by reference in its entirety.

BACKGROUND

Field of the Disclosure

The present disclosure relates to an insert type expandable garnish and a method of installing the same, and more particularly, to an insert type expandable garnish and a method of installing the same, which minimize the formation of a gap or a step between a vehicle surface and a garnish installed on the vehicle surface.

Description of Related Art

As shown in FIGS. 1 and 2, in the prior art, a garnish 1 has been mounted to a vehicle panel 2. In particular, as shown in FIG. 1, a gap is formed between the garnish 1 and the panel 2 which are disconnected by the gap therebetween. As shown in FIG. 2, if a position of an outer panel 2-1, a position of an inner panel 2-2, and the height directional length of the garnish 1 are all accurate as far as placement, no gap is formed. However, if a tolerance occurs in either one, a minute gap may occur between the garnish 1 and the outer panel 2-1.

Meanwhile, a vehicle driven by a motor is designed with a smooth surface which does not have a gap or a step in appearance (e.g., external appearance). However, as shown in FIGS. 1 and 2, according to the conventional garnish installation structure, since a gap or a step may be formed between the garnish 1 and the panel 2, it may be difficult to produce the vehicle with a smooth surface.

The contents described in this section are merely to help the understanding of the background of the present disclosure, and may include what is not previously known to those skilled in the art to which the present disclosure pertains.

SUMMARY

An object of the present disclosure is to provide an insert type expandable garnish and a method of installing the same, which may minimize the formation of a gap or a step between a garnish and a panel, thereby implementing an externally smooth design or improved external aesthetic.

An insert type expandable garnish according to an exemplary embodiment of the present disclosure provided for achieving the object may include a body part inserted into a mounting part of a groove shape formed on the surface of a vehicle, a tension structure part disposed on the body part to press the body part from the inner bottom surface of the mounting part toward the outside of the vehicle, when the body part is pressed toward the mounting part in a state inserted into the mounting part, and an expandable bracket part that protrudes from the body part, and adhered with the mounting part, when the tension structure part presses the body part.

In addition, the mounting part may include a mounting aperture formed in an outer panel forming the appearance of the vehicle, and an inner panel fixed to the inside of the outer panel to cover the mounting aperture, and formed in a bowl shape, and the inner bottom surface of the mounting part may be formed on the inner panel. In addition, the width of the mounting aperture may be less than the width of the inner panel, and the expandable bracket part may be adhered to one surface of the outer panel facing the inner panel.

The expandable bracket part may be separated from the body part. In addition, the expandable bracket part may include a pin disposed on a connection site with the body part, and may be separated from the body part when the pin is detached from the connection site. A tool doorway through which a tool for detaching the pin from the connection site enters and exits may be disposed on the mounting part. In addition, a tool doorway through which a tool for detaching the pin from the connection site enters and exits may be disposed on the body part.

The body part may include an external exposure surface having the same shape as the mounting aperture, and a support column that extends from the external exposure surface toward the mounting part. The tension structure part may include a guide body into which the support column may be inserted, and a spring located inside the guide body. The expandable bracket part may include a rotary vane having a first side in the longitudinal direction connected to the external exposure surface by a pin, and having a second side in the longitudinal direction coated with an adhesive material.

The body part may further include a stopper that allows the rotary vane to form a right angle with the support column, after the expandable bracket part is protruded from the body part, and the stopper may be the end portion of the external exposure surface. after the expandable bracket part is protruded from the body part, the rotary vane may be in surface contact with the outer panel. The rotary vane may be formed in a bar shape having the length, and may have the center angled.

In addition, a gap may be formed between the guide body and the external exposure surface. The outer bottom of the guide body may contact the inner bottom surface of the mounting part, and an adhesive material may be coated on the outer bottom of the guide body. A stationary vane having a disc shape may be formed on the side surface of the guide body.

When the support column is inserted into the guide body by an external force, the rotary vane may be pushed by the stationary vane to rotate around the pin, and the second side of the rotary vane in the longitudinal direction may closely contact one surface of the outer panel. The expandable bracket part may further include a rotary spring for rotating the rotary vane around the pin toward the outer panel, a bent part may be formed at the second side of the rotary vane in the longitudinal direction, and a protrusion fastened to the bent part may be disposed on the circumference of the stationary vane.

When the support column is inserted into the guide body by an external force, the bent part and the protrusion may be separated from each other as the bent part is overshot, the rotary vane may be rotated around the pin by the rotary spring, and the second side of the rotary vane in the longitudinal direction may closely contact one surface of the outer panel. The external exposure surface may include a stopper column that contacts the stationary vane. In addition, before the expandable bracket part is protruded from the body part, the stopper column and the rotary vane may be in surface contact with each other.

A method of installing an insert type expandable garnish according to an exemplary embodiment of the present disclosure provided for achieving the object includes pressing the body part inserted into the mounting part toward the mounting part, pressing the body part from the mounting part toward the body part by the tension structure part, and adhering the expandable bracket part, which protrudes from the body part, with the mounting part.

In addition, the adhering of the expandable bracket part, which protrudes from the body part, with the mounting part may include separating a bent part and a protrusion by moving the bent part, which is disposed on the expandable bracket part, toward a vehicle interior more than the protrusion, which is disposed on the tension structure part to be engaged with the bent part, to be overshot, rotating a rotary vane, which is disposed on the expandable bracket part, around a pin for connecting the rotary vane with the body part by a rotary spring, and closely contacting the second side of the rotary vane in the longitudinal direction to one surface of an outer panel forming the mounting part.

According to the insert type expandable garnish and the method of installing the same according to an exemplary embodiment of the present disclosure provided as described above, the body part may be pressed from the mounting part toward the body part by the tension structure part and at the same time, may maintain a sufficient distance from the outer panel by the expandable bracket part, thereby matching the surface of the body part exposed externally with the outer panel. Accordingly, it may be possible to prevent or minimize the formation of a gap or step between the body part and the outer panel. In addition, since the shape of the mounting aperture formed in the body part and the outer panel is the same, the formation of the gap between the body part and the outer panel may be prevented or minimized.

Since the body part operates when receiving the external force in the state where both the tension structure part and the expandable bracket part have been inserted into the mounting part, the installation may be simplified. In particular, since there is no interference with the working direction, it may be applicable to various types of garnishes installed to each site of the vehicle.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an insert type expandable garnish and a method of installing the same according to an exemplary embodiment of the present disclosure will be described with reference to the accompanying drawings.

Figure 1:
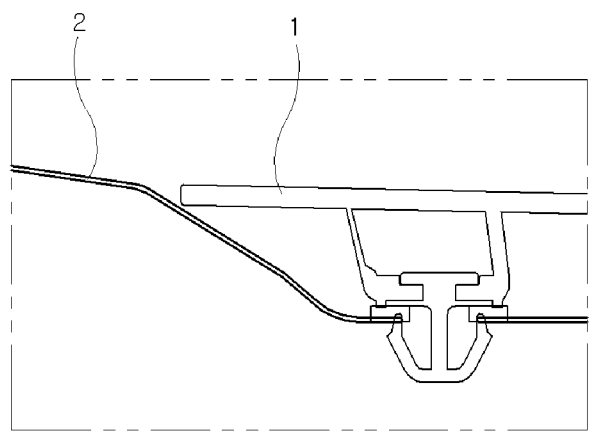
FIGS. 1 and 2 are exemplary diagrams showing a conventional garnish installation structure according to the prior art.
Figure 2:
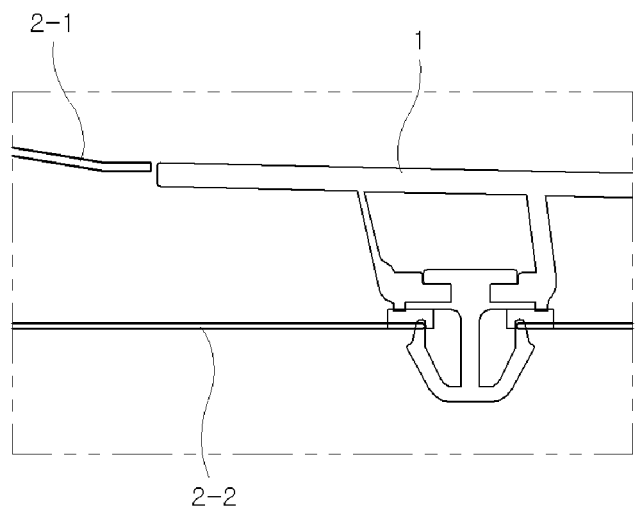
Figure 3:
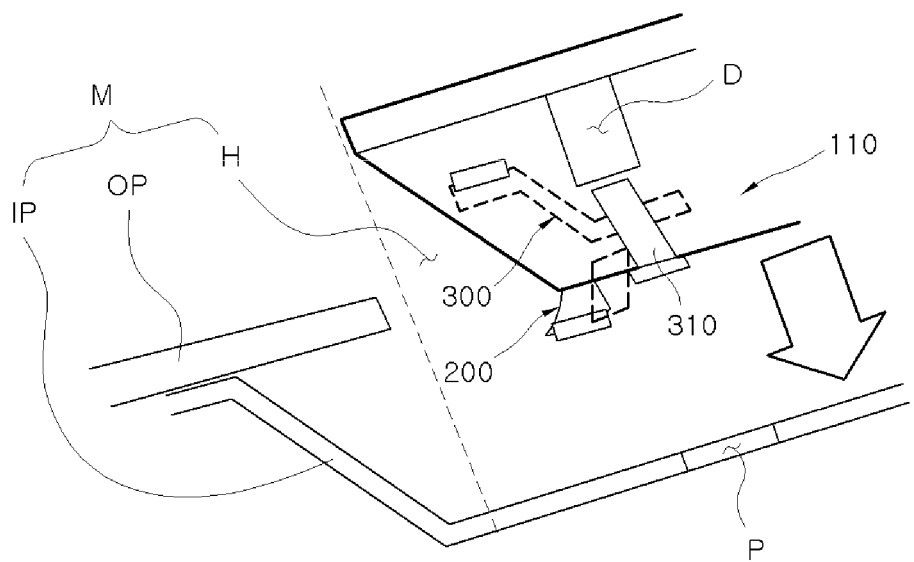
FIGS. 3 to 8 are cross-sectional diagrams showing an insert type expandable garnish according to an exemplary embodiment of the present disclosure.
Figure 4:
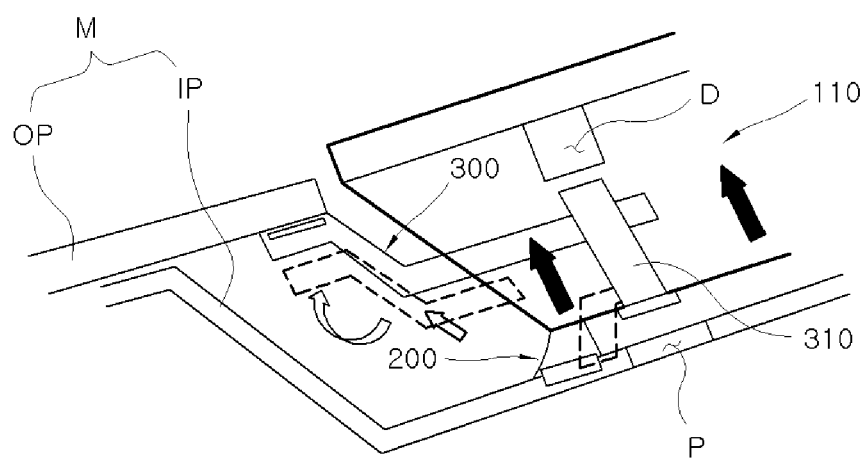

As shown in FIGS. 3 and 4, an insert type expandable garnish according to an exemplary embodiment of the present disclosure may include a body part 100 inserted into a mounting part (M) in a groove shape formed on the surface of a vehicle, a tension structure part 200 provided to the body part 100 to press the body part 100 from the inner bottom surface of the mounting part (M) to the outside of a vehicle when being pressed by an external force toward the mounting part (M) in a state where the body part 100 has been inserted into the mounting part (M), and an expandable bracket part 300 that protrudes from the body part 100, and adhered with the mounting part (M) when the tension structure part 200 presses the body part 100.

The mounting part (M) may include a mounting aperture (H) formed in an outer panel (OP) forming the appearance of the vehicle, and an inner panel (IP) fixed to the inside of the outer panel (OP) to cover the mounting aperture (H), and formed in a bowl shape. The inner bottom surface of the mounting part (M) may be formed on the inner panel (IP). A ring-shaped protrusion 231 may be formed on the inner bottom surface, that is, one surface of the inner panel (IP) to dispose the tension structure part 200 in an accurate position. The width of the mounting aperture (H) may be formed to be less than the width of the inner panel (IP). An expandable bracket part may be adhered to one surface of the outer panel (OP) facing the inner panel (IP).

Meanwhile, the expandable bracket part 300 may be separated from the body part 100. The expandable bracket part 300 may include a pin 310 disposed at the connection site with the body part 100. When the pin 310 is separated from the connection site, the expandable bracket part 300 may be separated from the body part 100. A tool doorway (D) through which a tool for detaching the pin 310 from the connection site enters and exits may be provided in the mounting part (M) or the body part 100. According to an example, the tool may be an awl, and the expandable bracket part 300 may be rotated around the pin 310. A surface layer forming the surface of the body part 100 may be disposed on the body part 100 to be separated from the body part 100. When the surface layer is removed, the tool doorway (D) may also be exposed externally.

According to the insert type expandable garnish according to an exemplary embodiment of the present disclosure configured as described above, the body part 100 may be pressed from the mounting part (M) toward the body part 100 by the tension structure part 200, and at the same time, may maintain a sufficient distance from the outer panel (OP) by the expandable bracket part 300, thereby matching the surface of the body part 100 exposed externally with the outer panel (OP). Accordingly, the formation of the step or gap between the body part 100 and the outer panel (OP) may be prevented or minimized.

Figure 5:
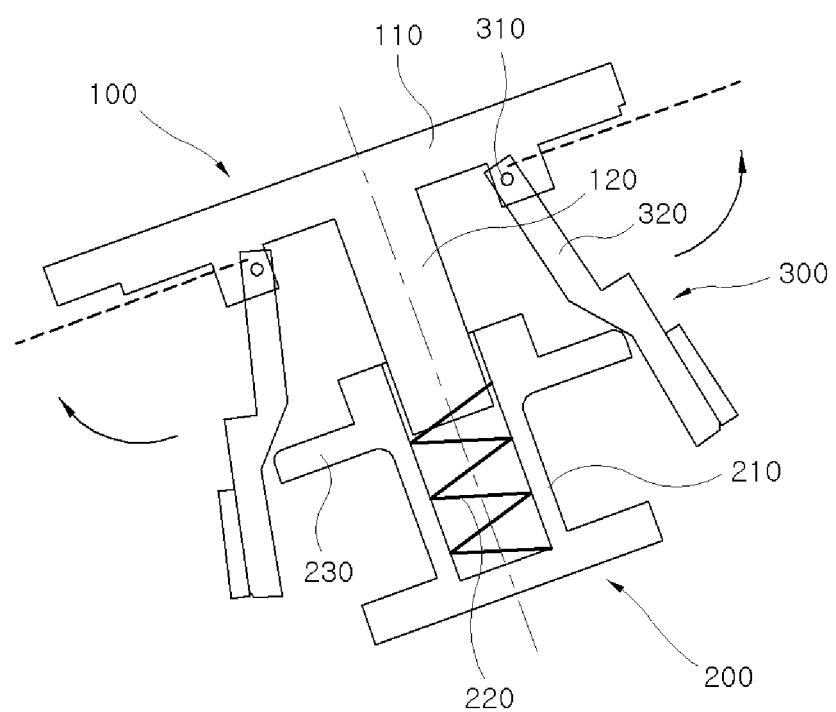
Figure 6:
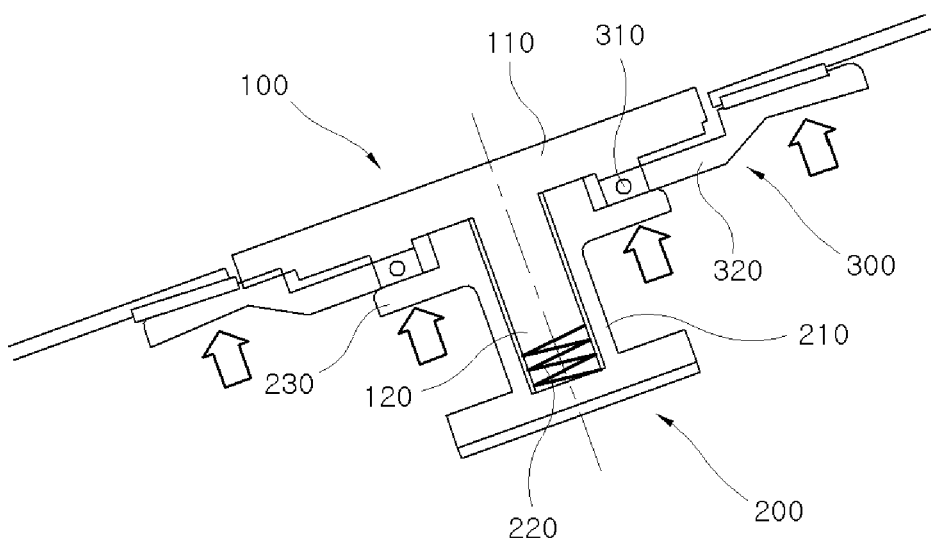

As shown in FIGS. 5 and 6, an insert type expandable garnish according to an exemplary embodiment of the present disclosure may be produced. As shown in FIGS. 5 and 6, the body part 100 may include an external exposure surface 110 having the same shape as the mounting aperture (H), and a support column 120 that extends from the external exposure surface 110 toward the mounting part (M). Since the shape of the mounting aperture (H) formed in the body part 100 and the outer panel (OP) is the same, the formation of a gap between the body part 100 and the outer panel (OP) may be prevented or minimized.

The tension structure part 200 may include a guide body 210 into which the support column 120 may be inserted, and a spring 220 disposed inside the guide body 210. The outer bottom of the guide body 210 contacts the inner bottom surface of the mounting part (M). An adhesive material may be coated on the outer bottom of the guide body 210. The side surface of the guide body 210 may be formed with a stationary vane 230 in a disc shape. A gap may be formed between the guide body 210 and the external exposure surface 110.

The expandable bracket part 300 may include a rotary vane 320 having a first side in the longitudinal direction connected to the external exposure surface 110 by the pin 310 and having a second side in the longitudinal direction coated with an adhesive material. The rotary vane 320 may be formed in a bar shape having the length, and may have an angled center. After the expandable bracket part 300 is protruded from the body part 100, a stopper may be mounted on the body part 100 so that the rotary vane 320 forms a right angle with the support column 120. The stopper is the end portion of the external exposure surface 110.

After the expandable bracket part 300 is protruded from the body part 100, the rotary vane 320 may be in surface contact with the outer panel (OP). When the support column 120 is inserted into the guide body 210 by an external force, the rotary vane 320 may be pushed by the stationary vane 230 to rotate around the pin 310. As the pin 310 rotates, the second side of the rotary vane 320 in the longitudinal direction closely contacts (e.g., abut) one surface of the outer panel (OP).

Figure 7:
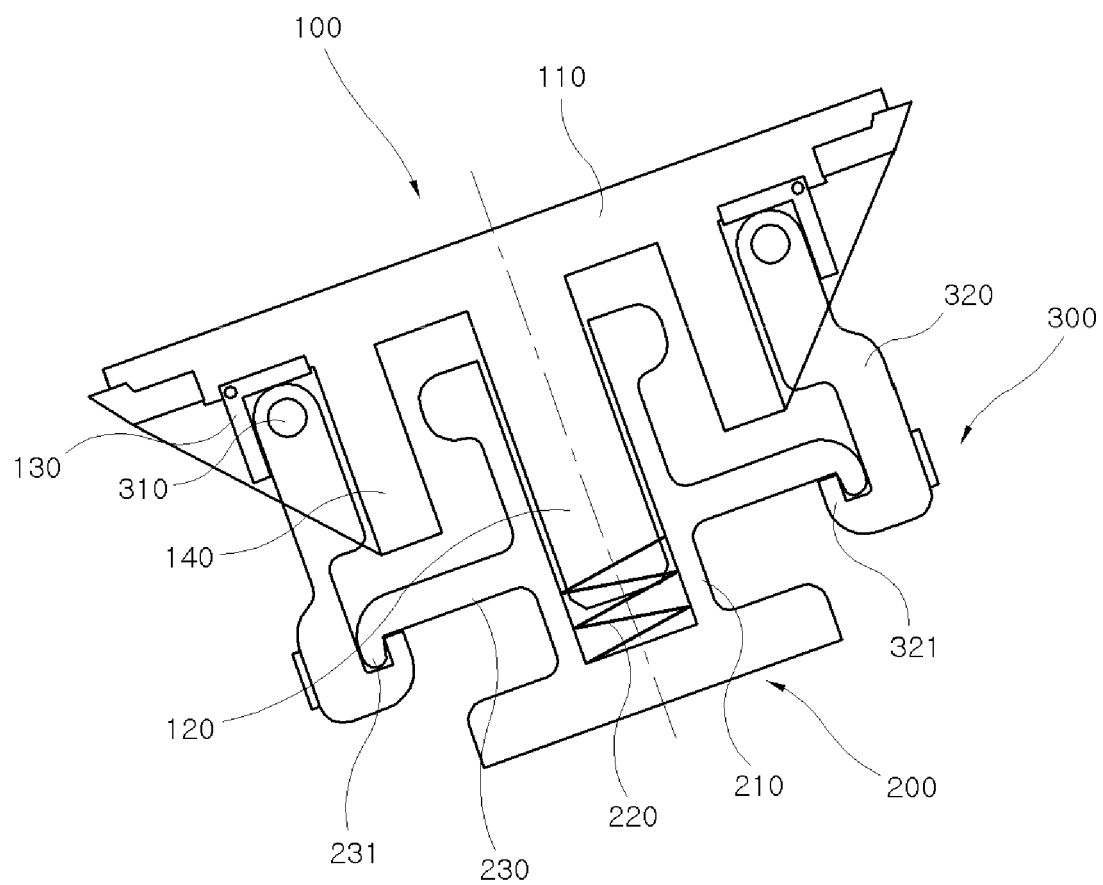
Figure 8:
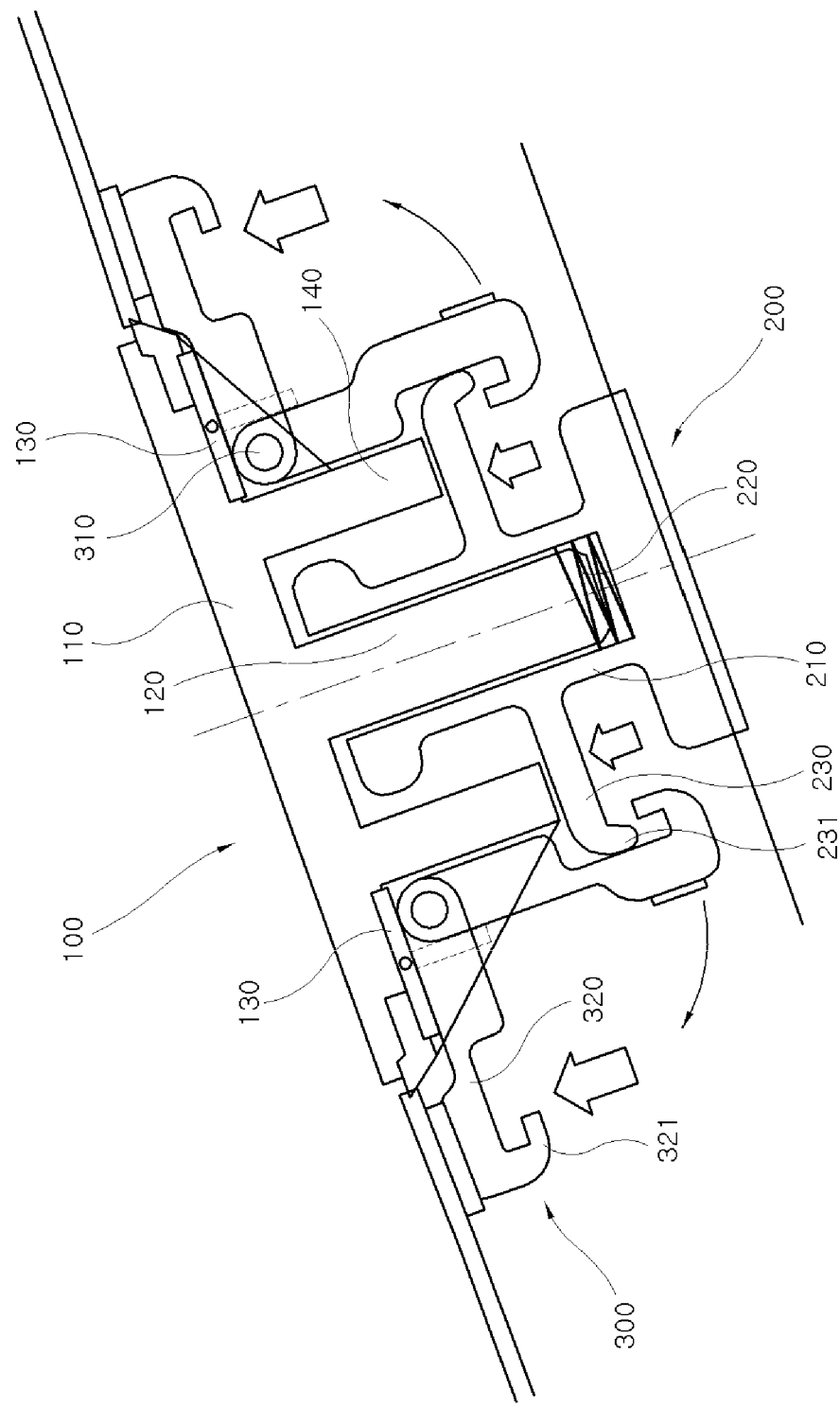

As shown in FIGS. 7 and 8, an insert type expandable garnish according to an exemplary embodiment of the present disclosure may be produced. As shown in FIGS. 7 and 8, the body part 100 may include the external exposure surface 110 having the same shape as the mounting aperture (H), and the support column 120 that extends from the external exposure surface 110 toward the mounting part (M). The external exposure surface 110 may include a stopper column 140 that contacts the stationary vane 230 provided in the tension structure part 200. Before the expandable bracket part 300 is protruded from the body part 100, the stopper column 140 and the rotary vane 320 are in surface contact with each other. The stopper column 140 and the rotary vanes 320 may be in abutting contact, or may be separated from each other.

Since the shape of the mounting aperture (H) formed in the body part 100 and the outer panel (OP) is the same, the formation of a gap between the body part 100 and the outer panel (OP) may be prevented or minimized. The tension structure part 200 may include the guide body 210 into which the support column 120 may be inserted, and a spring 220 disposed inside the guide body 210. The outer bottom of the guide body 210 may contact the inner bottom surface of the mounting part (M). An adhesive material may be coated on the outer bottom of the guide body 210. The side surface of the guide body 210 may be formed with the stationary vane 230 in a disc shape.

The expandable bracket part 300 may include the rotary vane 320 having a first side in the longitudinal direction connected to the external exposure surface 110 by the pin 310, and having a second side in the longitudinal direction coated with the adhesive material, and a rotary spring 130 configured to rotate the rotary vane 320 around the pin 310 toward the outer panel (OP). A bent part 321 may be formed at the second side of the rotary vane 320 in the longitudinal direction. In addition, a protrusion 231 fastened to the bent part 321 may be disposed on the circumference of the stationary vane 230 of the tension structure part 200.

When the support column 120 is inserted into the guide body 210 by an external force, the bent part 321 may be moved momentarily closer to the inner panel (IP) than the protrusion 231 and overshot. At this time, the bent part 321 and the protrusion 231 may be separated from each other. Then, the rotary vane 320 may be rotated around the pin 310 by the rotary spring 130. As the external force is gradually reduced, the rotary vane 320 may be moved toward the outer panel (OP). As a result, the second side of the rotary vane 320 in the longitudinal direction closely contacts (e.g., abutting contact) one surface of the outer panel (OP).

Figure 9:
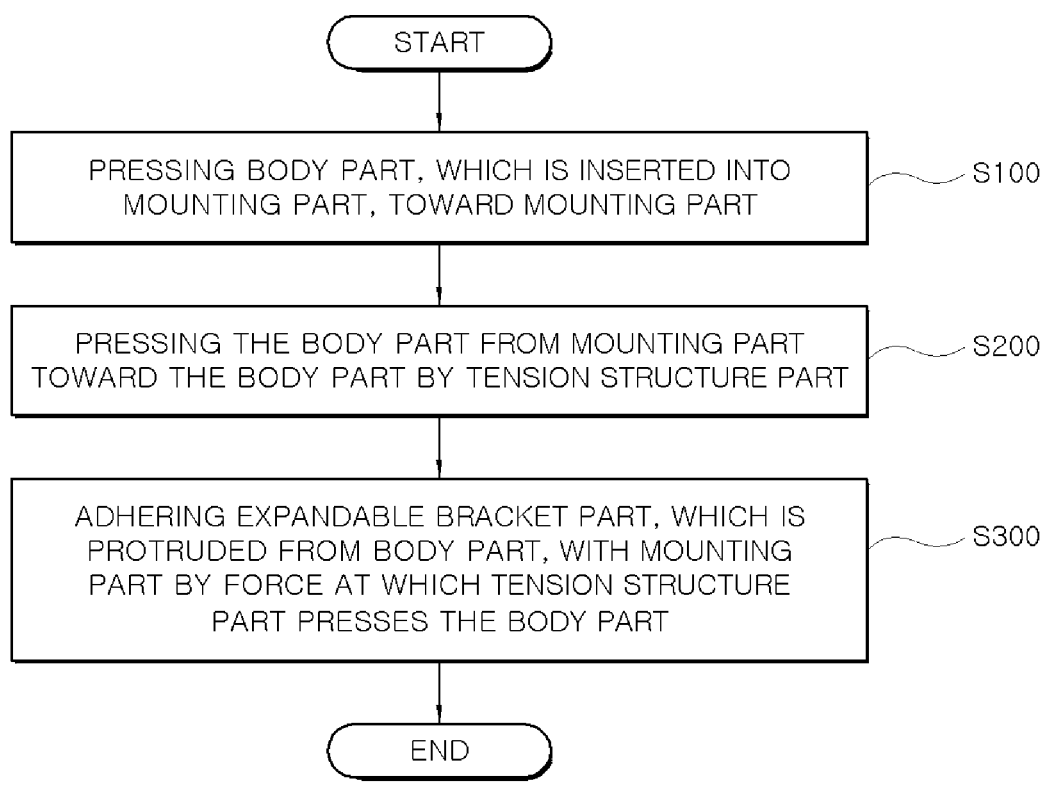
FIG. 9 is a flowchart showing a method of installing the insert type expandable garnish according to an exemplary embodiment of the present disclosure.

The insert type expandable garnish according to an exemplary embodiment of the present disclosure configured as described above is installed in the vehicle according to the flowchart shown in FIG. 9. As shown in FIG. 9, a method of installing the insert type expandable garnish according to an exemplary embodiment of the present disclosure may include pressing the body part 100 inserted into the mounting part (M) toward the mounting part (M) (S100), pressing the body part 100 from the mounting part (M) toward the body part 100 by the tension structure part 200 (S200), and adhering the expandable bracket part 300 protruded from the body part 100 with the mounting part (M) (S300).

Figure 10:
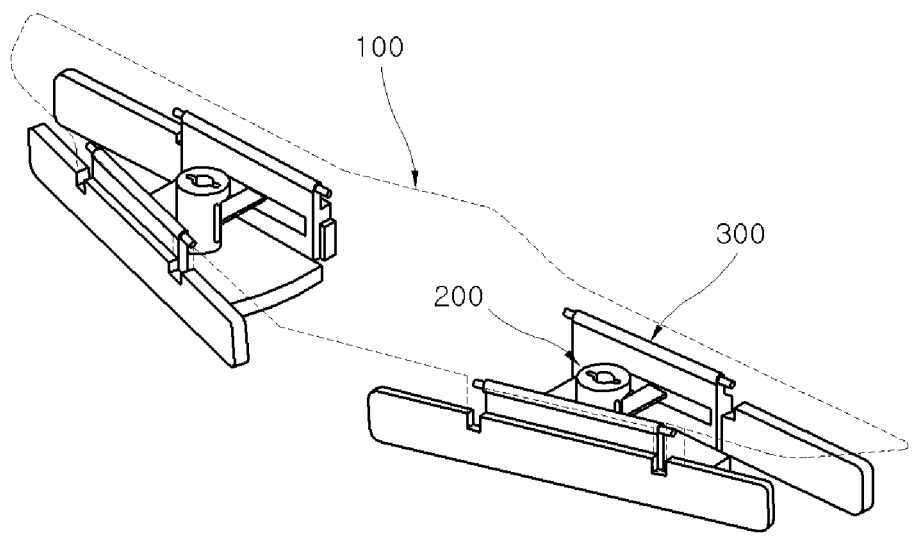
FIGS. 10 and 11 are perspective diagrams exemplifying a state where the insert type expandable garnish is installed according to an exemplary embodiment of the present disclosure in the flowchart of FIG. 9.

As shown in FIG. 10, in the pressing of the body part 100 inserted into the mounting part (M) toward the mounting part (M) (S100), both the tension structure part 200 and the expandable bracket part 300 may be inserted into the mounting part (M). In the pressing of the body part 100 from the mounting part (M) toward the body part 100 by the tension structure part 200 (S200), the body part 100 may be pressed toward the mounting part (M) by receiving an external force.

Figure 11:
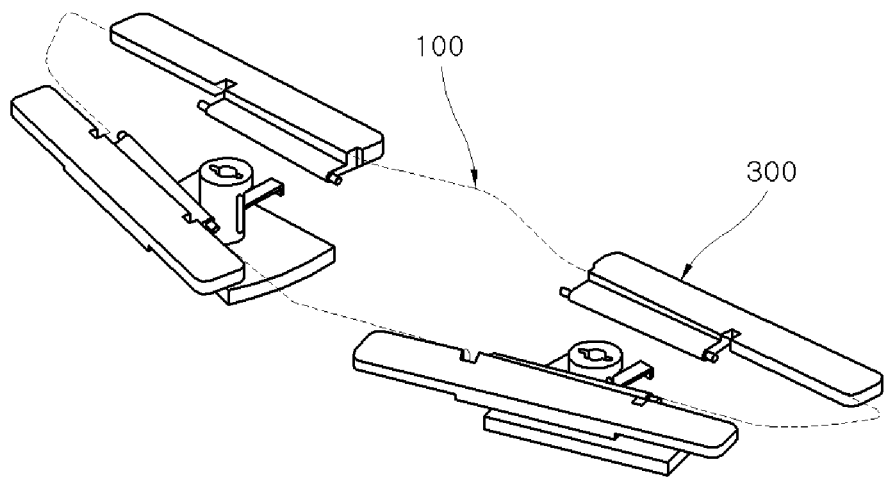

As shown in FIG. 11, in the adhering of the expandable bracket part 300 that protrudes from the body part 100 with the mounting part (M) (S300), the rotary vane 320 disposed on the expandable bracket part 300 may be rotated around a hinge by the stationary vane 230 disposed on the tension structure part 200, and the rotary vane 320 may be ultimately adhered to the outer panel.

Further referring to FIG. 8, the adhering of the expandable bracket part 300 that protrudes from the body part 100 with the mounting part (M) (S300) may include separating the bent part 321 and the protrusion 231 by moving the bent part 321, which protrudes from the expandable bracket part 300, toward the vehicle interior more than the protrusion 231, which protrudes from the tension structure part 200 to be engaged with the bent part 321, to be overshot, rotating the rotary vane 320, which protrudes from the expandable bracket part 300, around the pin 310 for connecting the rotary vane 320 with the body part 100 by the rotary spring 130, and closely contacting the second side of the rotary vane 320 in the longitudinal direction to one surface of the outer panel (OP) forming the mounting part (M).

According to the insert type expandable garnish and the method of installing the same according to an exemplary embodiment of the present disclosure provided as described above, the body part 100 may be pressed from the mounting part (M) toward the body part 100 by the tension structure part 200, and at the same time, may maintain a sufficient distance from the outer panel (OP) by the expandable bracket part 300, thereby matching the surface of the body part 100 exposed externally with the outer panel (OP). Accordingly, the formation of a step or gap between the body part 100 and the outer panel (OP) may be prevented or minimized. In addition, since the shapes of the body part 100 and the mounting aperture (H) formed in the outer panel (OP) is the same, the formation of a gap between the body part 100 and the outer panel (OP) may be prevented or minimized.

Further, since the body part 100 operates when receiving the external force in the state where both the tension structure part 200 and the expandable bracket part 300 have been inserted into the mounting part (M), the installation is simplified. In particular, since there is no interference with the working direction, it may be applicable to various types of garnishes installed to each site of the vehicle.

What is claimed is:

1. An insert type expandable garnish, comprising:
a body part inserted into a mounting part of a groove shape formed on the surface of a vehicle;
a tension structure part disposed on the body part to press the body part from an inner bottom surface of the mounting part toward the outside of the vehicle, when the body part is pressed toward the mounting part and inserted into the mounting part; and
an expandable bracket part that protrudes from the body part, and adhered with the mounting part, when the tension structure part presses the body part,
wherein the mounting part includes:
a mounting aperture formed in an outer panel forming an external appearance of the vehicle; and
an inner panel fixed to an inside of the outer panel to cover the mounting aperture, and formed in a bowl shape,
wherein the inner bottom surface of the mounting part is formed on the inner panel, and
wherein the width of the mounting aperture is formed to be less than the width of the inner panel, and wherein the expandable bracket part is adhered to one surface of the outer panel facing the inner panel.

2. The insert type expandable garnish of claim 1, wherein the expandable bracket part is seperable from the body part.

3. The insert type expandable garnish of claim 2, wherein the expandable bracket part includes a pin provided on a connection site with the body part, and wherein the expandable bracket part is separated from the body part when the pin is detached from the connection site.

4. The insert type expandable garnish of claim 3, wherein a tool doorway through which a tool for detaching the pin from the connection site enters and exits is provided on the mounting part.

5. The insert type expandable garnish of claim 3, wherein a tool doorway through which a tool for detaching the pin from the connection site enters and exits is provided on the body part.

6. The insert type expandable garnish of claim 1, wherein the body part includes:
an external exposure surface having a same shape as the mounting aperture; and
a support column that extends from the external exposure surface toward the mounting part,
wherein the tension structure part includes:
a guide body into which the support column is inserted; and
a spring disposed inside the guide body, and
wherein the expandable bracket part includes a rotary vane having a first side in the longitudinal direction connected to the external exposure surface by a pin, and a second side in the longitudinal direction coated with an adhesive material.

7. The insert type expandable garnish of claim 6, wherein the body part further includes a stopper for the rotary vane to form a right angle with the support column, after the expandable bracket part is protruded from the body part.

8. The insert type expandable garnish of claim 6, wherein after the expandable bracket part is protruded from the body part, the rotary vane is in surface contact with the outer panel.

9. The insert type expandable garnish of claim 6, wherein the rotary vane is formed in a bar shape having a length, and has an angled center.

10. The insert type expandable garnish of claim 6, wherein a gap is formed between the guide body and the external exposure surface.

11. The insert type expandable garnish of claim 6, wherein the outer bottom of the guide body contacts the inner bottom surface of the mounting part, and wherein an adhesive material is coated on the outer bottom of the guide body.

12. The insert type expandable garnish of claim 6, wherein a stationary vane having a disc shape is formed on the side surface of the guide body.

13. The insert type expandable garnish of claim 12, wherein when the support column is inserted into the guide body by an external force, the rotary vane is pushed by the stationary vane to rotate around the pin, and the second side of the rotary vane in the longitudinal direction contacts one surface of the outer panel.

14. The insert type expandable garnish of claim 12, wherein the expandable bracket part further includes a rotary spring for rotating the rotary vane around the pin toward the outer panel, wherein a bent part is formed at the second side of the rotary vane in the longitudinal direction, and wherein a protrusion fastened to the bent part is disposed on the circumference of the stationary vane.

15. The insert type expandable garnish of claim 14, wherein when the support column is inserted into the guide body by an external force, the bent part and the protrusion are separated from each other as the bent part is overshot, the rotary vane is rotated around the pin by the rotary spring, and the second side of the rotary vane in the longitudinal direction contacts one surface of the outer panel.

16. The insert type expandable garnish of claim 14, wherein the external exposure surface includes a stopper column that contacts the stationary vane, and wherein before the expandable bracket part is protruded from the body part, the stopper column and the rotary vane are in surface contact with each other.

17. A method of installing an insert type expandable garnish which installs the insert type expandable garnish of claim 1, comprising:
   pressing the body part inserted into the mounting part toward the mounting part;
   pressing the body part from the mounting part by the tension structure part; and
   adhering the expandable bracket part, which is protruded from the body part, with the mounting part.

18. The method of claim 17, wherein the adhering of the expandable bracket part, which is protruded from the body part, with the mounting part includes:
   separating a bent part and a protrusion by moving the bent part, which is disposed on the expandable bracket part, toward a vehicle interior more than the protrusion, which is disposed on the tension structure part to be engaged with the bent part, to be overshot;
   rotating a rotary vane, which is disposed on the expandable bracket part, around a pin for connecting the rotary vane with the body part by a rotary spring; and
   contacting the second side of the rotary vane in the longitudinal direction to one surface of an outer panel forming the mounting part.

\* \* \* \* \*